_(12)_ United States Patent
Wu et al.

(10) Patent No.: US 8,410,737 B2
(45) Date of Patent: Apr. 2, 2013

(54) DEVICE AND METHOD FOR GENERATING AN INITIAL CONTROLLER LOOKUP TABLE FOR AN IPM MACHINE

(75) Inventors: Long Wu, Fargo, ND (US); Srujan Kusumba, Fargo, ND (US); Zimin W. Vilar, Dubuque, IA (US); Tianjun Fu, Fargo, ND (US); Robert Shaw, Moorhead, MN (US)

(73) Assignee: Deere & Company, Moline, IL (US)

( * ) Notice: Subject to any disclaimer, the term of this patent is extended or adjusted under 35 U.S.C. 154(b) by 233 days.

(21) Appl. No.: 13/036,382

(22) Filed: Feb. 28, 2011

(65) Prior Publication Data

US 2012/0217916 A1 Aug. 30, 2012

(51) Int. Cl.
*H02P 1/46* (2006.01)
(52) U.S. Cl. ............... 318/400.11; 318/400.2; 318/430; 318/432; 180/65.265
(58) Field of Classification Search ............ 318/400.02, 318/400.11, 430–434; 388/801, 804; 180/65.265
See application file for complete search history.

(56) References Cited

U.S. PATENT DOCUMENTS

| | | | |
|---|---|---|---|
| 4,023,083 A | 5/1977 | Plunkett | |
| 4,814,677 A | 3/1989 | Plunkett | |
| 5,428,283 A | 6/1995 | Kalman et al. | |
| 5,486,748 A | 1/1996 | Konrad et al. | |
| 5,914,582 A | 6/1999 | Takamoto et al. | |
| 6,275,000 B1 | 8/2001 | Nishimura | |
| 6,326,750 B1 * | 12/2001 | Marcinkiewicz | ............ 318/432 |
| 6,801,013 B2 * | 10/2004 | Woodward et al. | ........... 318/804 |
| 6,952,088 B2 * | 10/2005 | Woodward et al. | ........... 318/430 |
| 7,045,988 B2 | 5/2006 | Ha et al. | |
| 7,157,878 B2 | 1/2007 | Collier-Hallman | |
| 7,272,302 B2 * | 9/2007 | Woodward et al. | ........... 388/801 |
| 7,472,013 B1 * | 12/2008 | Wiggins et al. | ............... 701/102 |
| 7,573,227 B2 | 8/2009 | Kasaoka et al. | |
| 7,733,044 B2 | 6/2010 | Nakamura et al. | |
| 7,759,886 B2 * | 7/2010 | Gallegos-Lopez et al. | .......................... 318/400.2 |
| 7,923,953 B2 * | 4/2011 | Gallegos-Lopez et al. | .......................... 318/400.2 |
| 7,973,505 B2 * | 7/2011 | Suhama et al. | ............... 318/432 |
| 8,175,790 B2 * | 5/2012 | Stemler et al. | ................ 701/110 |

(Continued)

OTHER PUBLICATIONS

M. Elbuluk and M. Kankam, "Speed Sensorless Induction Motor Devices for Electrical Actuators: Schemes, Trends and Tradeoffs," National Aerospace and Electronics Conference cosponsored by IEEE, Wright-Patterson AFB, Dayton, OH, Jul. 14-18, 1997.

(Continued)

*Primary Examiner* — Paul Ip
(74) *Attorney, Agent, or Firm* — Harness, Dickey & Pierce

(57) ABSTRACT

Embodiments of the present invention provide a device and method for generating initial operating points for controlling an interior permanent magnet (IPM) machine. The method includes loading an inductance lookup table, first calculating a maximum torque per Ampere (MTPA) trajectory for a first threshold speed based on machine parameters of the IPM machine, second calculating a truncated voltage limit ellipse with monotonically increasing torque for a first speed based on the machine parameters, if the first speed is higher than the first threshold speed, determining an operating trajectory at the first speed based on at least one of the calculated MTPA trajectory and the calculated truncated voltage limit ellipse, and generating an $I_d, I_q$ map that maps an $I_d$ value and an $I_q$ value to each torque command of a plurality of torque commands for the first speed based on the determined operating trajectory.

36 Claims, 9 Drawing Sheets

U.S. PATENT DOCUMENTS

| | | | | |
|---|---|---|---|---|
| 8,228,016 | B2* | 7/2012 | Gallegos-Lopez et al. | 318/609 |
| 8,269,446 | B2* | 9/2012 | Suhama et al. | 318/432 |
| 2004/0066160 | A1* | 4/2004 | Woodward et al. | 318/430 |
| 2004/0067049 | A1* | 4/2004 | Woodward et al. | 388/801 |
| 2004/0067050 | A1* | 4/2004 | Woodward et al. | 388/804 |
| 2006/0247829 | A1 | 11/2006 | Sato | |
| 2008/0303477 | A1* | 12/2008 | Patel | 318/802 |
| 2009/0027000 | A1* | 1/2009 | Gallegos-Lopez et al. | 318/722 |
| 2009/0234538 | A1* | 9/2009 | Ta et al. | 701/41 |
| 2009/0284195 | A1* | 11/2009 | Gallegos-Lopez et al. | 318/400.02 |
| 2010/0038158 | A1* | 2/2010 | Whitney et al. | 180/65.265 |
| 2010/0045224 | A1* | 2/2010 | Suhama et al. | 318/434 |
| 2010/0171456 | A1* | 7/2010 | Chakrabarti et al. | 318/461 |
| 2010/0231149 | A1* | 9/2010 | Gallegos-Lopez et al. | 318/400.02 |
| 2011/0031919 | A1* | 2/2011 | Green | 318/432 |

OTHER PUBLICATIONS

S. Van Haute et al., "Design and Control of a Permanent Magnet Synchronous Motor Drive for a Hybrid Electric Vehicle," Katholieke University Leauven, Belgium.

M.E. Haque et al., "Improved Trajectory Control for an Interior Permanent Magnet Synchronous Motor Drive With Extended Operating Limit" School of Electrical Engineering and Telecommunication, University of New South Wales, Sydney, Australia, whole document.

J.L. Kirtley Jr., "Class Notes Chapter 12: Permanent Magnet "Brushless DC" Motors" 6.061 Introduction to Power Systems, Massachusetts Institute of Technology, Department of Electrical Engineering and Computer Science, Feb. 5, 2003, whole document.

US 7,595,604, 09/2009, Tomigashi (withdrawn)

* cited by examiner

DEVICE AND METHOD FOR GENERATING AN INITIAL CONTROLLER LOOKUP TABLE FOR AN IPM MACHINE

FIELD

Example embodiments are related to a device and method for generating an initial controller lookup table for controlling an Interior Permanent Magnet (IPM) machine.

BACKGROUND

AC machines are extensively used in loaders or other heavy equipment machinery because they provide a higher efficiency than DC machines. Of the AC machines, an IPM machine has a high drive efficiency wide operating speed range for constant power region. An IPM machine controller also called an inverter, controls operation of the IPM machine. The controller produces ac control signals which are applied to the terminals of the IPM machine. Typically the controller controls the IPM machine based on information or a portion of information characterizing the IPM machine. At least part of the characterization refers to the operational model of the IPM machine that permits translation of input requests into desired operational output. For example, a desired output torque may be requested, and based on part of the characterization, the controller controls the IPM machine to deliver the desired torque. In order to provide the desired output torque, the IPM controller outputs operating points to the IPM machine in response to a desired torque.

One conventional method uses theoretical equations to find machine operating points, which may not be accurate. Another conventional method utilizes finite element analysis to find correct operating points, which is very time consuming. In addition, these conventional methods may not cover the full operating range in terms of speed and torque level.

SUMMARY

Embodiments of the present invention provide a method for generating initial operating points for controlling an interior permanent magnet (IPM) machine.

The method includes loading an inductance lookup table, where the inductance lookup table includes sets of a direct axis inductance ($L_d$) value and a quadrature axis inductance ($L_q$) value and each set corresponds to a current peak magnitude and a current control angle. The current control angle may indicate amounts of the current peak magnitude appearing as direct axis current ($I_d$) and quadrature axis current ($I_q$).

The method also includes first calculating a maximum torque per Ampere (MTPA) trajectory for a first threshold speed based on machine parameters of the IPM machine, second calculating a truncated voltage limit ellipse with monotonically increasing torque for a first speed based on the machine parameters, if the first speed is higher than the first threshold speed, determining an operating trajectory at the first speed based on at least one of the calculated MTPA trajectory and the calculated truncated voltage limit ellipse, and generating an $I_d,I_q$ map that maps an $I_d$ value and an $I_q$ value to each torque command of a plurality of torque commands for the first speed based on the determined operating trajectory.

In some embodiments, the first threshold speed is a base speed, the base speed being a maximum shaft speed at which maximum constant output torque of the IPM machine is achieved.

The determining step may further include the following: if the first speed is lower than a second threshold speed and higher than the first threshold speed, the determining step determines the operating trajectory based on a comparison of the calculated MTPA trajectory and the calculated truncated voltage limit ellipse; if the first speed is the second threshold speed or higher than the second threshold speed, the determining step determines the operating trajectory based on the calculated truncated voltage limit ellipse with monotonically increasing torque only; and/or if the first speed is the first threshold speed or lower than the first threshold speed, the determining step determines the operating trajectory based on the calculated MTPA trajectory.

In some embodiments, the second threshold speed is a critical speed, the critical speed being a speed at which uncontrolled generation (UCG) voltage from a back-electromotive force (backemf) of the IPM machine is equal to a direct current (DC) bus voltage.

If the first speed is lower than the second threshold speed and higher than the first threshold speed, the determining step includes selecting the lesser of an $I_q$ value of the calculated MTPA trajectory and an $I_q$ value of the calculated truncated voltage limit ellipse for each $I_d$ value, where the operating trajectory includes the selected $I_q$ values.

The first calculating step may further include determining an initial table, where the initial table includes $I_d,I_q$ combinations having values covering all possible values for a preset current limit, calculating the current peak magnitude, the current control angle, and the $L_d$ and $L_q$ values for each $I_d,I_q$ combination of the initial table, calculating torque for each $I_d,I_q$ combination of the initial table based on the machine parameters, setting a torque range for each of the plurality of torque commands, determining a subset of $I_d,I_q$ combinations for each torque command based on the calculated torque and the set torque range, selecting an $I_d,I_q$ combination from each subset that has a calculated current peak magnitude less than other $I_d,I_q$ combinations of the subset, and/or calculating the MTPA trajectory based on the selected sets of $I_d,I_q$ combinations.

In some embodiment, the calculated torque for each of the $I_d,I_q$ combinations in the determined subset falls within the set torque range encompassing a respective torque command.

The second calculating step may further include determining an $I_d$ vertex value for the voltage limit ellipse right vertex at a set shaft speed based on the machine parameters, calculating maximum allowable $I_q$ values corresponding to a range of $I_d$ values, where the range of $I_d$ values is from the determined $I_d$ vertex value to a preset minimum $I_d$ limit, and/or calculating the voltage limit ellipse for the first speed based on the calculated maximum allowable $I_q$ values. Also, the $I_d$ vertex value may be forced to zero if the determined $I_d$ vertex value is greater than zero.

The second calculating step may further include calculating torque along points of the calculated voltage limit ellipse at the first speed, and/or truncating the calculated voltage limit ellipse by disregarding monotonically decreasing torque.

In some embodiments, the method may further include obtaining the $L_d$ values and the $L_q$ values using finite element analysis based simulation, and generating the inductance look-up table based on the obtained inductance parameters.

In some embodiments the method may further include generating a different $I_d,I_q$ map for a plurality of speeds by repeating the second calculating step, the determining step, and the generating step for each speed, and constructing an integrated $I_d,I_q$ map based on the plurality of $I_d,I_q$ maps.

In some embodiments, the IPM machine includes a machine controller having the $I_d,I_q$ map, as discussed above.

In another embodiment, the method includes first calculating a maximum torque per Ampere (MTPA) trajectory for a first threshold speed based on machine parameters of the IPM machine, second calculating a truncated voltage limit ellipse with monotonically increasing torque for a first speed based on the machine parameters, if the first speed is higher than the first threshold speed, determining an operating trajectory at the first speed based on at least one of the calculated MTPA trajectory and the calculated truncated voltage limit ellipse, and generating an $I_d,I_q$ map that maps a direct axis current ($I_d$) value and a quadrature axis current ($I_q$) value to each torque command of a plurality of torque commands for the first speed based on the determined operating trajectory. The determining step includes determining the operating trajectory based on a comparison of the calculated MTPA trajectory and the calculated truncated voltage limit ellipse if the first speed is lower than a second threshold speed and higher than the first threshold speed.

In some embodiments, the first threshold speed is a base speed, the base speed being a maximum shaft speed at which maximum constant output torque of the IPM machine is achieved, and the second threshold speed is a critical speed, where the critical speed is a speed at which uncontrolled generation (UCG) voltage from a back-electromotive force (backemf) of the IPM machine is equal to a direct current (DC) bus voltage.

In some embodiments, the machine parameters include an inductance lookup table. The inductance lookup table includes sets of a direct axis inductance ($L_d$) value and a quadrature axis inductance ($L_q$) value, and each set corresponds to a current peak magnitude and a current control angle, where the current control angle may include amounts of the current peak magnitude appearing as $I_d$ and $I_q$.

The determining step may further include the following: if the first speed is the second threshold speed or higher than the second threshold speed, the determining step determines the operating trajectory based on the calculated truncated voltage limit ellipse with monotonically increasing torque only; and/or if the first speed is the first threshold speed or lower than the first threshold speed, the determining step determines the operating trajectory based on the calculated MTPA trajectory. The determining step may further include selecting the lesser of an $I_q$ value of the calculated MTPA trajectory and an $I_q$ value of the calculated truncated voltage limit ellipse for each $I_d$ value, where the operating trajectory includes the selected $I_q$ values.

The first calculating step may include determining an initial table, where the initial table includes $I_d,I_q$ combinations having values covering all possible values for a preset current limit, calculating the current peak magnitude, the current control angle, and the $L_d$ and $L_q$ values for each $I_d,I_q$ combination of the initial table, calculating torque for each $I_d,I_q$ combination of the initial table based on the machine parameters, setting a torque range for each of the plurality of torque commands, determining a subset of $I_d,I_q$ combinations for each torque command based on the calculated torque and the set torque range, selecting an $I_d,I_q$ combination from each subset that has a calculated current peak magnitude less than other $I_d,I_q$ combinations of the subset, and calculating the MTPA trajectory based on the selected sets of $I_d,I_q$ combinations.

In some embodiments, the calculated torque for each of the $I_d,I_q$ combinations in the determined subset falls within the set torque range encompassing a respective torque command.

The second calculating step may include determining an $I_d$ vertex value at the voltage limit ellipse right vertex point at a set shaft speed based on the machine parameters, calculating maximum allowable $I_q$ values corresponding to a range of $I_d$ values, where the range of $I_d$ values is from the determined $I_d$ vertex value to a preset minimum $I_d$ limit, and/or calculating the voltage limit ellipse for the first speed based on the calculated maximum allowable $I_q$ values. The $I_d$ vertex value may be forced to zero if the determined $I_d$ vertex value is greater than zero.

The second calculating step may further include calculating torque along points of the calculated voltage limit ellipse at the first speed, and truncating the calculated voltage limit ellipse by disregarding monotonically decreasing torque.

The method may further include generating a different $I_d,I_q$ map for a plurality of speeds by repeating the second calculating step, the determining step, and the generating step for each speed, and constructing an integrated $I_d,I_q$ map based on the plurality of $I_d,I_q$ maps. In some embodiments, the IPM machine includes a machine controller having the $I_d,I_q$ map, as described above.

Embodiments of the present invention provide a computer processing unit for generating initial operating points for controlling an interior permanent magnet (IPM) machine.

The computer processing unit includes a memory configured to store machine parameters. The machine parameters include an inductance lookup table. the inductance lookup table includes sets of a direct axis inductance ($L_d$) value and a quadrature axis inductance ($L_q$) value. Each set may correspond to a current peak magnitude and a current control angle. The current control angle may indicate amounts of the current peak magnitude appearing as direct axis current ($I_d$) and quadrature axis current ($I_q$).

The computer processing unit may also include a processor configured to first calculate a maximum torque per Ampere (MTPA) trajectory for a first threshold speed based on the machine parameters. The processor is configured to second calculate a truncated voltage limit ellipse with monotonically increasing torque for a first speed based on the machine parameters, if the first speed is higher than the first threshold speed. The processor is configured to determine an operating trajectory at the first speed based on at least one of the calculated MTPA trajectory and the calculated truncated voltage limit ellipse. The processor is configured to generate an $I_d,I_q$ map that maps an $I_d$ value and an $I_q$ value to each torque command of a plurality of torque commands for the first speed based on the determined operating trajectory.

In some embodiments, the first threshold speed is a base speed, where the base speed is a maximum shaft speed at which maximum constant output torque of the IPM machine is achieved.

In some embodiment, if the first speed is lower than a second threshold speed and higher than the first threshold speed, the processor is configured to determine the operating trajectory based on a comparison of the calculated MTPA trajectory and the calculated truncated voltage limit ellipse; if the first speed is the second threshold speed or higher than the second threshold speed, the processor is configured to determine the operating trajectory based on the calculated truncated voltage limit ellipse with monotonically increasing torque only; and/or if the first speed is the first threshold speed or lower than the first threshold speed, the processor is configured to determine the operating trajectory based on the calculated MTPA trajectory.

In some embodiments, the second threshold speed is a critical speed, where the critical speed is a speed at which uncontrolled generation (UCG) voltage from a back-electromotive force (backemf) of the IPM machine is equal to a direct current (DC) bus voltage.

If the first speed is lower than the second threshold speed and higher than the first threshold speed, the processor is configured to select lesser of an $I_q$ value of the calculated MTPA trajectory and an $I_q$ value of the calculated truncated voltage limit ellipse for each $I_d$ value, where the operating trajectory includes the selected $I_q$ values.

Also, the processor may be configured to determine an initial table, where the initial table includes $I_d,I_q$ combinations having values covering all possible values for a preset current limit, to calculate the current peak magnitude, the current control angle, and the $L_d$ and $L_q$ values for each $I_d,I_q$ combination of the initial table, to calculate torque for each $I_d,I_q$ combination of the initial table based on the machine parameters, to set a torque range for each of the plurality of torque commands, to determine a subset of $I_d,I_q$ combinations for each torque command based on the calculated torque and the set torque range, to select an $I_d,I_q$ combination from each subset that has a calculated current peak magnitude less than other $I_d,I_q$ combinations of the subset, and to calculate the MTPA trajectory based on the selected sets of $I_d,I_q$ combinations. The calculated torque for each of the $I_d,I_q$ combinations in the determined subset may fall within the set torque range encompassing a respective torque command.

Also, the processor may be configured to determine an $I_d$ vertex value for the voltage limit ellipse right vertex at a set shaft speed based on the machine parameters, to calculate maximum allowable $I_q$ values corresponding to a range of $I_d$ values, where the range of $I_d$ values is from the determined $I_d$ vertex value to a preset minimum $I_d$ limit, and to calculate the voltage limit ellipse for the first speed based on the calculated maximum allowable $I_q$ values. Also, the $I_d$ vertex value may be forced to zero if the determined $I_d$ vertex value is greater than zero.

Also, the processor may be configured to calculate torque along points of the calculated voltage limit ellipse at the first speed, and to truncate the calculated voltage limit ellipse by disregarding monotonically decreasing torque. The processor is configured to generate a different $I_d,I_q$ map for a plurality of speeds by repeating the second calculating step, the determining step, and the generating step for each speed, and to construct an integrated $I_d,I_q$ map based on the plurality of $I_d,I_q$ maps.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION OF EXAMPLE EMBODIMENTS

Figure 1:
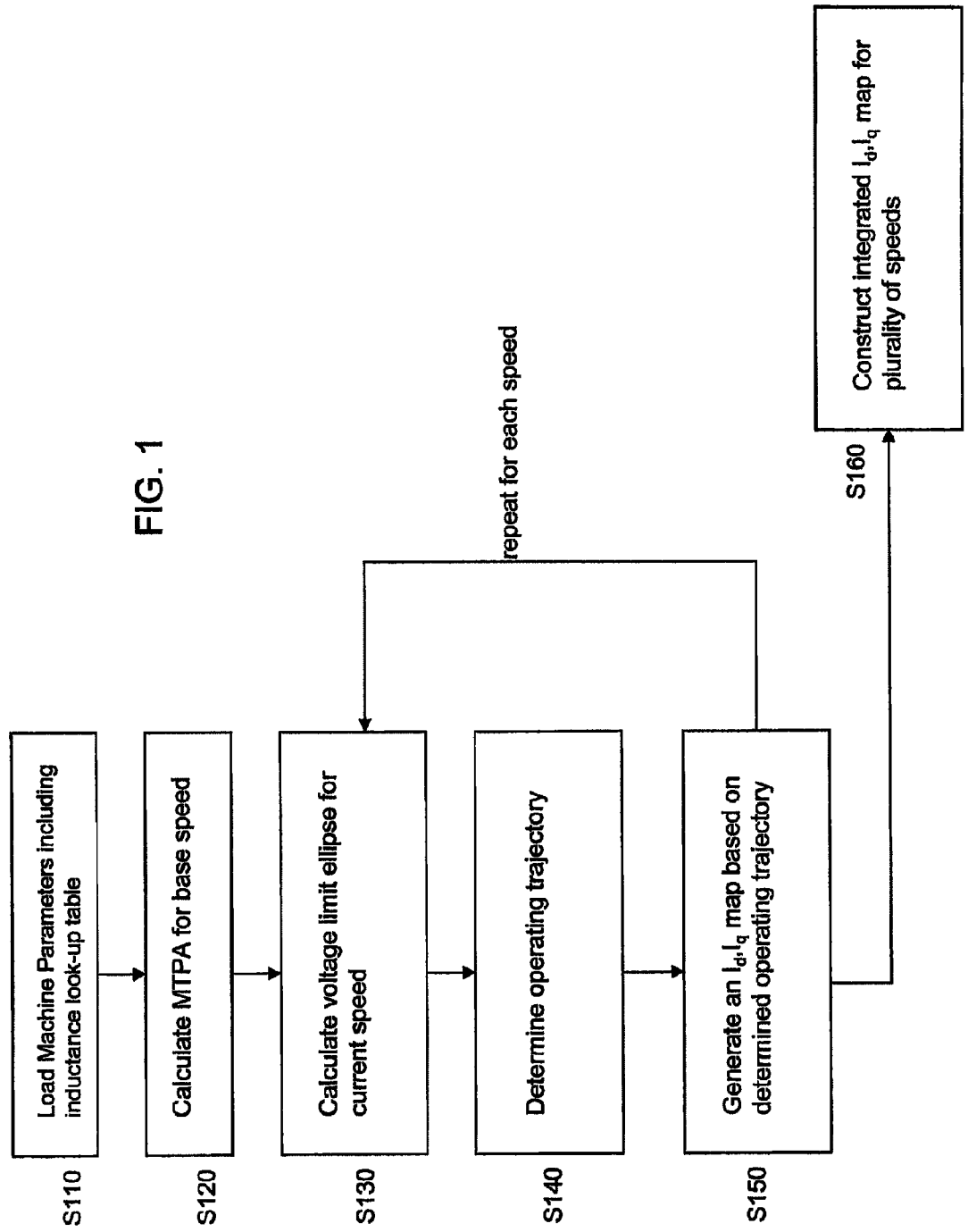
FIG. 1 illustrates a method for constructing an $I_d,I_q$ map for a plurality of speeds according to an embodiment of the present invention.

Various example embodiments will now be described more fully with reference to the accompanying drawings in which some example embodiments are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the tenns "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes that include routines, programs, objects, components, data structures, etc., that when executed perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like machines that once programmed become particular machines.

It should be borne in mind, however, that all of these and similar terms are to be associated with the appropriate physical quantities and are merely convenient labels applied to these quantities. Unless specifically stated otherwise, or as is apparent from the discussion, terms such as "obtaining", "determining", "calculating", "selecting", "setting", "truncating", "generating", or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present invention provide a device and method for generating initial operating points for an interior permanent magnet (IPM) machine. The IPM machine may be any type of IPM machine that is well known to one of ordinary skill in the art. For example, an IPM machine may include a stator with slots and a rotor with permanent magnet poles, as well as a controller configured to control the IPM machine. The initial operating points may be stored in at least one lookup table, which is used in the operation of the IPM machine.

Each operating point includes a direct axis current ($I_d$) value and quadrature axis current ($I_q$) value, which also may be referred to as a flux current command and a torque current command, respectively. The current commands, $I_d$ and $I_q$, are components of a current peak magnitude ($I_s$) and a current control angle ($\gamma$). The current control angle ($\gamma$) indicates amounts of $I_s$ appearing as $I_d$ and $I_q$ in the d-q plane. In one embodiment, the current control angle ($\gamma$) is the angle of the current peak magnitude ($I_s$) in relation to the positive q-axis of the d-q plane. The relationship between the current peak magnitude $I_s$ and the current control angle ($\gamma$) and $I_d$ and $I_q$ are as follows.

$$I_s = \sqrt{i_d^2 + i_q^2} \quad \text{Eq. (1)}$$

$$I_d = -I_s \sin\gamma \text{ and } I_q = I_s \cos\gamma \quad \text{Eq. (2)}$$

The current command $I_q$ may have a positive or negative sign (+/−) depending on the torque command sign. The current commands indicate the appropriate amount of current to be applied to the IPM machine in response to a torque command (e.g., 50 Nm) and an operating speed. According to an embodiment, an operating point is mapped to each torque command for a plurality of speeds encompassing the full range of the IPM machine. The torque command may be expressed in terms of a torque percentage of the full range (e.g., 0%, 5%, 10%, 15%). The operating points and corresponding torque commands are stored in at least one lookup table having $I_d, I_q$ maps. Therefore, in response to a particular torque command and operating speed, the IPM machine selects the corresponding operating point (e.g., $I_d$ value, $I_q$ value) based on the appropriate $I_d, I_p$ map in the at least one lookup table.

The initial operating points may be used to test the performance of the IPM machine. For example, based on the initial operating points, a user may (a) test basic torque control, speed control and voltage control on the IPM machine, (b) tune machine current loop, speed loop, voltage loop proportional integral (PI) gains, (c) test machine thermal performance and limitations, (d) evaluate power electronics losses and select optimal pulse-width modulation (PWM) switching frequencies, and (e) establish a foundation for position calibration and motor characterization, for example.

According to some embodiments, the generated initial operating points may provide operating points for the full operating range (e.g., full torque and full speed range) of the IPM machine, while meeting specified current and voltage limitations. In addition, the generation of the initial operating points uses given machine parameters of the IPM machine such as actual inductance values that are not assumed to be constant and are heavily coupled between dq-axes. As a result, the generated initial operating points may be beneficial for understanding how well the IPM machine is designed for a specific application purpose such as (a) whether the IPM machine is oversized or short of torque generation capability, (b) whether the required current for low speed full torque operation is too large, (c) whether sufficient voltage exists for high speed operation and corresponding angle is too large, and (d) whether the sensitivity of torque versus position is too large, for example.

FIG. 1 illustrates a method for constructing an $I_d, I_q$ map for a plurality of speeds according to an embodiment of the present invention. The method may be performed by any type of computer processing unit having a memory and a processor, as explained below with reference to FIG. 2.

Figure 2:
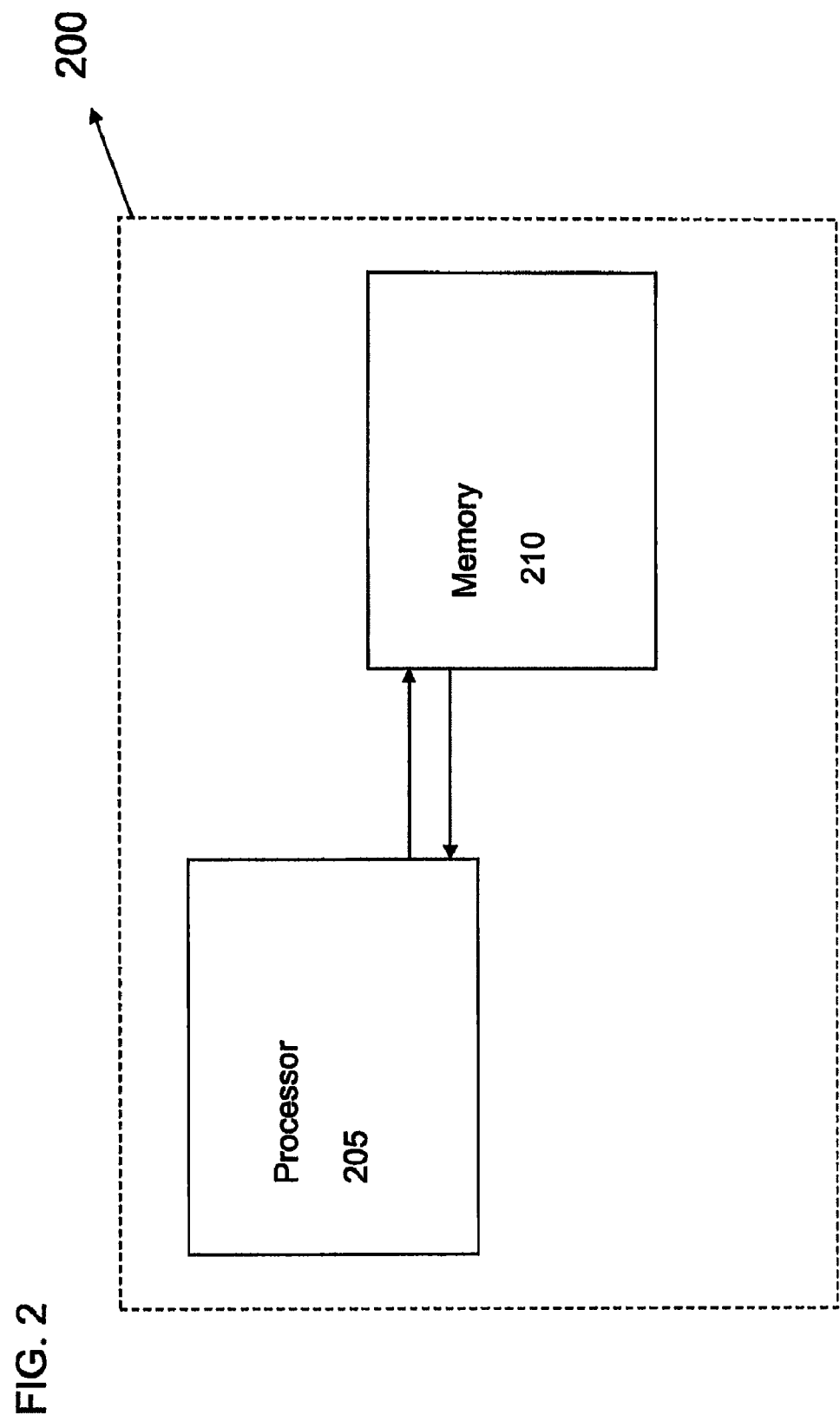
FIG. 2 illustrates a device 200 for constructing an $I_d,I_q$ map for a plurality of speeds according to an embodiment of the present invention.

FIG. 2 illustrates a device 200 for constructing an $I_d, I_q$ map for a plurality of speeds according to an embodiment of the present invention. The device 200 includes a processor 205 and at least one memory 210. The device 200 may include other components that are well known to one of ordinary skill in the art. The processor 205 may be any type of processor configured to execute program codes stored in the at least one memory 210. The memory 210 may be any type of memory such as Random-access memory (RAM) and Read-only memory (ROM), for example. The device 200 may perform in any of the operations in FIGS. 1 and 4-6 of the present application, as further explained below.

Referring back to FIG. 1, in step S110, the processor 205 loads the machine parameters of the IPM machine from the at least one memory 210. The machine parameters may include a back electromotive force (backemf) constant ($\lambda_f$), a current limit, a number of pole pairs of the IPM machine, a direct current (DC) bus voltage level, an inductance lookup table, a stator resistance, and/or a permanent magnet strength coefficient with respect to temperature, for example. Further, the machine parameters may include any other type of parameter that is well known to one of ordinary skill in the art.

The inductance lookup table may include sets of a direct axis inductance ($L_d$) value and a quadrature axis inductance ($L_q$) value. Each set corresponds to a current peak magnitude ($I_s$) and a current control angle ($\gamma$). Tables 1 and 2, shown below, illustrate one embodiment of the inductance lookup table.

TABLE 1

|       | 0°    | 5°    | 10°   | 15°   | 20°   | 25°   | 30°   | ...   | 90°   |
|-------|-------|-------|-------|-------|-------|-------|-------|-------|-------|
| 0 A   | $L_d$ | $L_d$ | $L_d$ | $L_d$ | $L_d$ | $L_d$ | $L_d$ | $L_d$ | $L_d$ |
| 25 A  | $L_d$ | $L_d$ | $L_d$ | $L_d$ | $L_d$ | $L_d$ | $L_d$ | $L_d$ | $L_d$ |
| 50 A  | $L_d$ | $L_d$ | $L_d$ | $L_d$ | $L_d$ | $L_d$ | $L_d$ | $L_d$ | $L_d$ |
| 75 A  | $L_d$ | $L_d$ | $L_d$ | $L_d$ | $L_d$ | $L_d$ | $L_d$ | $L_d$ | $L_d$ |
| 100 A | $L_d$ | $L_d$ | $L_d$ | $L_d$ | $L_d$ | $L_d$ | $L_d$ | $L_d$ | $L_d$ |
| 125 A | $L_d$ | $L_d$ | $L_d$ | $L_d$ | $L_d$ | $L_d$ | $L_d$ | $L_d$ | $L_d$ |

TABLE 1-continued

|       | 0°    | 5°    | 10°   | 15°   | 20°   | 25°   | 30°   | ...   | 90°   |
|-------|-------|-------|-------|-------|-------|-------|-------|-------|-------|
| to    | $L_d$ | $L_d$ | $L_d$ | $L_d$ | $L_d$ | $L_d$ | $L_d$ | $L_d$ | $L_d$ |
| 400 A | $L_d$ | $L_d$ | $L_d$ | $L_d$ | $L_d$ | $L_d$ | $L_d$ | $L_d$ | $L_d$ |

TABLE 2

|       | 0°    | 5°    | 10°   | 15°   | 20°   | 25°   | 30°   | ...   | 90°   |
|-------|-------|-------|-------|-------|-------|-------|-------|-------|-------|
| 0 A   | $L_q$ | $L_q$ | $L_q$ | $L_q$ | $L_q$ | $L_q$ | $L_q$ | $L_q$ | $L_q$ |
| 25 A  | $L_q$ | $L_q$ | $L_q$ | $L_q$ | $L_q$ | $L_q$ | $L_q$ | $L_q$ | $L_q$ |
| 50 A  | $L_q$ | $L_q$ | $L_q$ | $L_q$ | $L_q$ | $L_q$ | $L_q$ | $L_q$ | $L_q$ |
| 75 A  | $L_q$ | $L_q$ | $L_q$ | $L_q$ | $L_q$ | $L_q$ | $L_q$ | $L_q$ | $L_q$ |
| 100 A | $L_q$ | $L_q$ | $L_q$ | $L_q$ | $L_q$ | $L_q$ | $L_q$ | $L_q$ | $L_q$ |
| 125 A | $L_q$ | $L_q$ | $L_q$ | $L_q$ | $L_q$ | $L_q$ | $L_q$ | $L_q$ | $L_q$ |
| to    | $L_q$ | $L_q$ | $L_q$ | $L_q$ | $L_q$ | $L_q$ | $L_q$ | $L_q$ | $L_q$ |
| 400 A | $L_q$ | $L_q$ | $L_q$ | $L_q$ | $L_q$ | $L_q$ | $L_q$ | $L_q$ | $L_q$ |

Table 1 provides the inductance value for $L_d$, while Table 2 provides the inductance value for $L_q$. However, embodiments of the present invention encompass any type of arrangement that maps the peak current magnitude and the current control angle to inductance values of $L_d$ and $L_q$. For example, in another embodiment, Table 1 and Table 2 may be embodied into one table.

Each row corresponds to a specified peak current magnitude ($I_s$) (e.g. 0 A, 25 A, 50 A, etc.). The highest peak current magnitude level in Tables 1 and 2 should exceeded the maximum current limit for the IPM machine, which is determined by either a machine winding thermal limit or a hardware switching component current limit. Although Tables 1 and 2 illustrate 400 A as the highest peak current magnitude, embodiments of the present invention may encompass any value.

Each column corresponds to a specified current control angle ($\gamma$) (e.g., 0°, 5°, 10°, ... , 85°, 90°). Because IPM machine operation is assumed to be symmetrical in the second and third quadrants of the d-q plane, providing the $L_d$ and $L_q$ values for the current control angles from 90 to 180 is not required.

Each $L_d$ and $L_q$ value corresponding to a specific peak current magnitude ($I_s$) and a current control angle ($\gamma$) may be obtained using finite element analysis (FEA) based simulation tools such as SPEED, JMAG, Ansys, or Ansoft, for example. The FEA based simulation electromagnetically analyzes the IPM machine to generate the $L_d$ and $L_q$ values for the lookup inductance table. In other words, a machine designer may fill in the inductance lookup table by executing an iterative FEA based simulation for the IPM machine.

The backemf constant ($\lambda_f$) may be defined as follows:

$$V_{line\_line\_rms} = \frac{\sqrt{3}}{\sqrt{2}} \cdot \omega_{elec} \cdot \lambda_f \qquad \text{Eq. (3)}$$

The parameter $\lambda_f$ is the backemf constant and has the unit of volts per electric radians/second, the parameter $\omega_{elec}$ is the electrical frequency, and the parameter $V_{line\_line\_rms}$ is the fundamental root mean square (rms) of the machine terminal line to line voltage. The machine terminal line to line voltage is the voltage applied to the IPM machine.

The DC bus voltage level for a particular application may be used. The DC bus voltage is the voltage supply from the power supply to the controller of the IPM machine. For example, when the IPM machine operates in the medium to high speed region, the DC bus voltage level directly determines the voltage limit boundary which further limits output torque at higher speeds.

Also, depending on the machine size and the DC bus voltage level, a stator resistance may or may not be important for the initial operating points. Basically, for high power machines with a high DC bus voltage level (e.g. a traction machine for a heavy off-road vehicle), the voltage drop across the phase resistance is usually negligible. However, for low power low voltage machines (e.g., turf care machine), the voltage drop across the phase resistance may be considered for voltage limit evaluation.

For more advanced/accurate IPM motor control evaluation, the permanent magnet strength coefficient with respect to temperature may be required, e.g., −0.11% per degree C. The permanent magnet strength coefficient may be helpful to properly compensate output torque variation due to magnet temperature change.

In step S120, the processor 205 calculates a maximum torque per Ampere (MTPA) trajectory for a first threshold speed based on the machine parameters of the IPM machine, which include the inductance lookup table. The first threshold speed may be a base speed, which is the maximum shaft speed at which constant maximum output torque of the IPM machine is achieved. For operating speeds at the base speed or below the base speed, the operating points ($I_d,I_q$) are determined based only on the MTPA trajectory. However, in some instances, for operating speeds above the base speed, the calculated MTPA for the base speed is used in the determining of the operating trajectory for the current speed. The details of step S120 are further explained with reference to FIG. 4 of the present invention.

In step S130, the processor 205 calculates a truncated voltage limit ellipse with monotonically increasing torque for a first speed based on the machine parameters, if the first speed is higher than the first threshold speed. For example, for operating speed higher than the first threshold speed, the operation of the IPM machine may be limited by the voltage limit ellipse. The first speed may be any speed within a plurality of speeds that encompass the full operating range of the IPM machine. If the first speed is higher than the first threshold speed, the processor 205 calculates the truncated voltage limit ellipse. The details of step S130 are further explained with reference to FIG. 5 of the present invention.

In step S140, the processor 205 determines an operating trajectory based on at least one of the calculated MTPA trajectory and the calculated truncated voltage limit ellipse. For example, if the first speed is lower than a second threshold speed and higher than the first threshold speed, step S140 determines the operating trajectory based on a comparison of the calculated MTPA trajectory and the calculated truncated voltage limit ellipse. The second threshold speed may be a critical speed, which is a speed at which uncontrolled generation (UCG) voltage from the backemf of the IPM machine is equal to the DC bus voltage. If the first speed is the second threshold speed or higher than the second threshold speed, step S140 determines the operating trajectory based on the calculated truncated voltage limit ellipse with monotonically increasing torque only. If the first speed is the first threshold speed or lower than the first threshold speed, step S140 determines the operating trajectory based only on the calculated MTPA trajectory. The details of step S140 are further explained with reference to FIG. 5 of the present invention.

In S150, the processor 205 generates an $I_d,I_q$ map for the first speed based on the determined operating trajectory. The $I_d,I_q$ map may be a lookup table that includes torque commands ($T_{cmd}$) versus direct axis current commands ($i_{d\_cmd}$)

and torque commands ($T_{cmd}$) versus quadrature axis current commands ($i_{q\_cmd}$). As explained above, the torque commands may be expressed in torque percentage. For example, a torque value such as 50 Nm may be converted to a torque percentage such as 5%, and the torque percentage may be stored in association with the current commands. The details of step S150 are further explained with reference to FIGS. 5-6 of the present invention.

Steps 130, 140 and 150 are repeated for each speed for the plurality of speeds. As a result, the processor 205 generates a different $I_d, I_q$ map for the plurality of speeds. In step S160, the processor constructs an integrated $I_d, I_q$ map based on the plurality of $I_d, I_q$ maps. For example, the integrated $I_d, I_q$ map may include a plurality of lookup tables, where each lookup table provides the torque commands ($T_{cmd}$) versus direct axis current commands ($i_{d\_cmd}$) and the torque commands ($T_{cmd}$) versus quadrature axis current commands ($i_{q\_cmd}$) for a corresponding speed. The details of step S160 are further explained with reference to FIGS. 5-6 of the present invention.

Figure 3A:
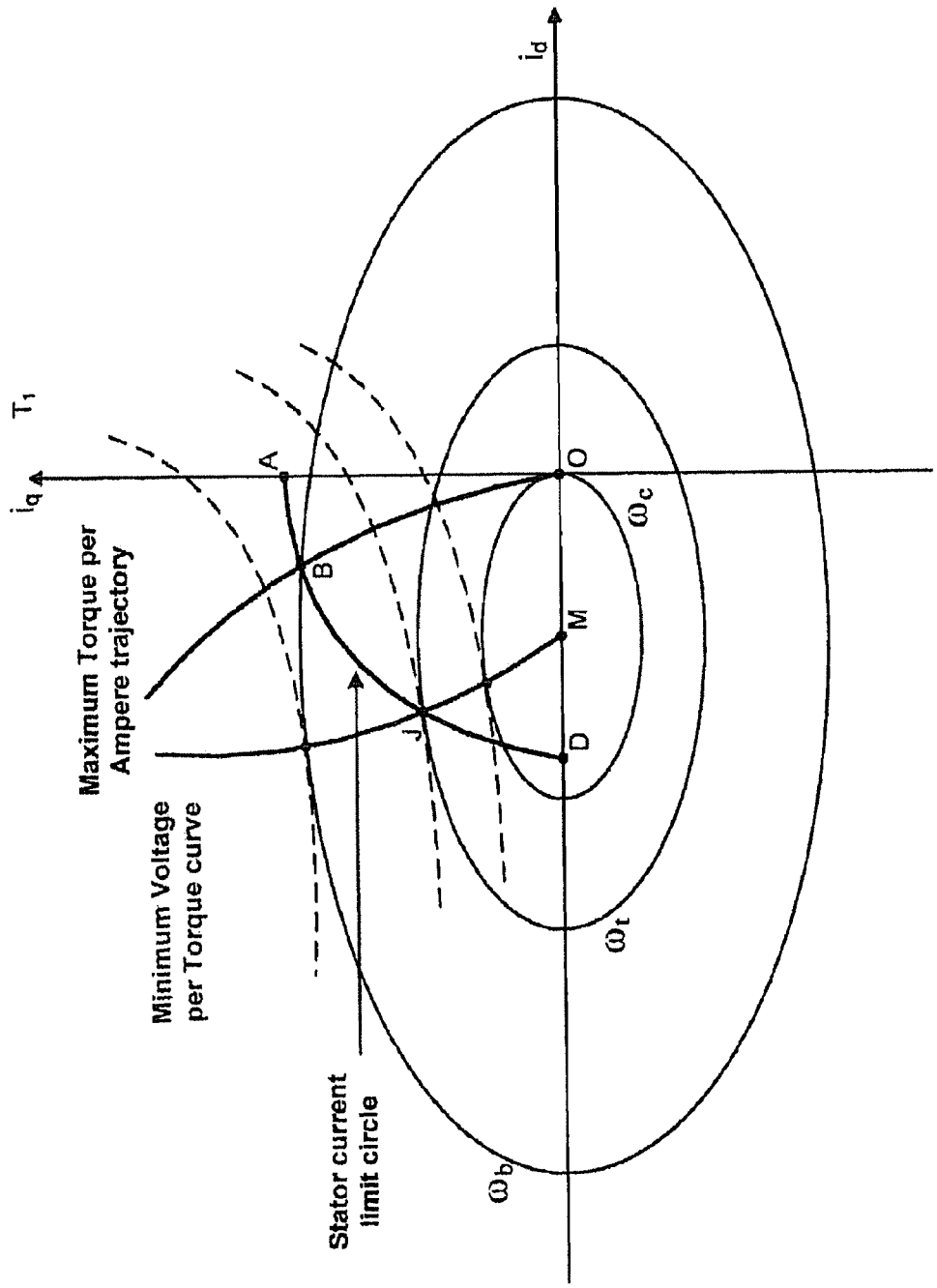
FIG. 3A includes a plurality of curves and a plurality of voltage limit ellipses in a d-q plane according to an embodiment of the present invention.
Figure 3B:
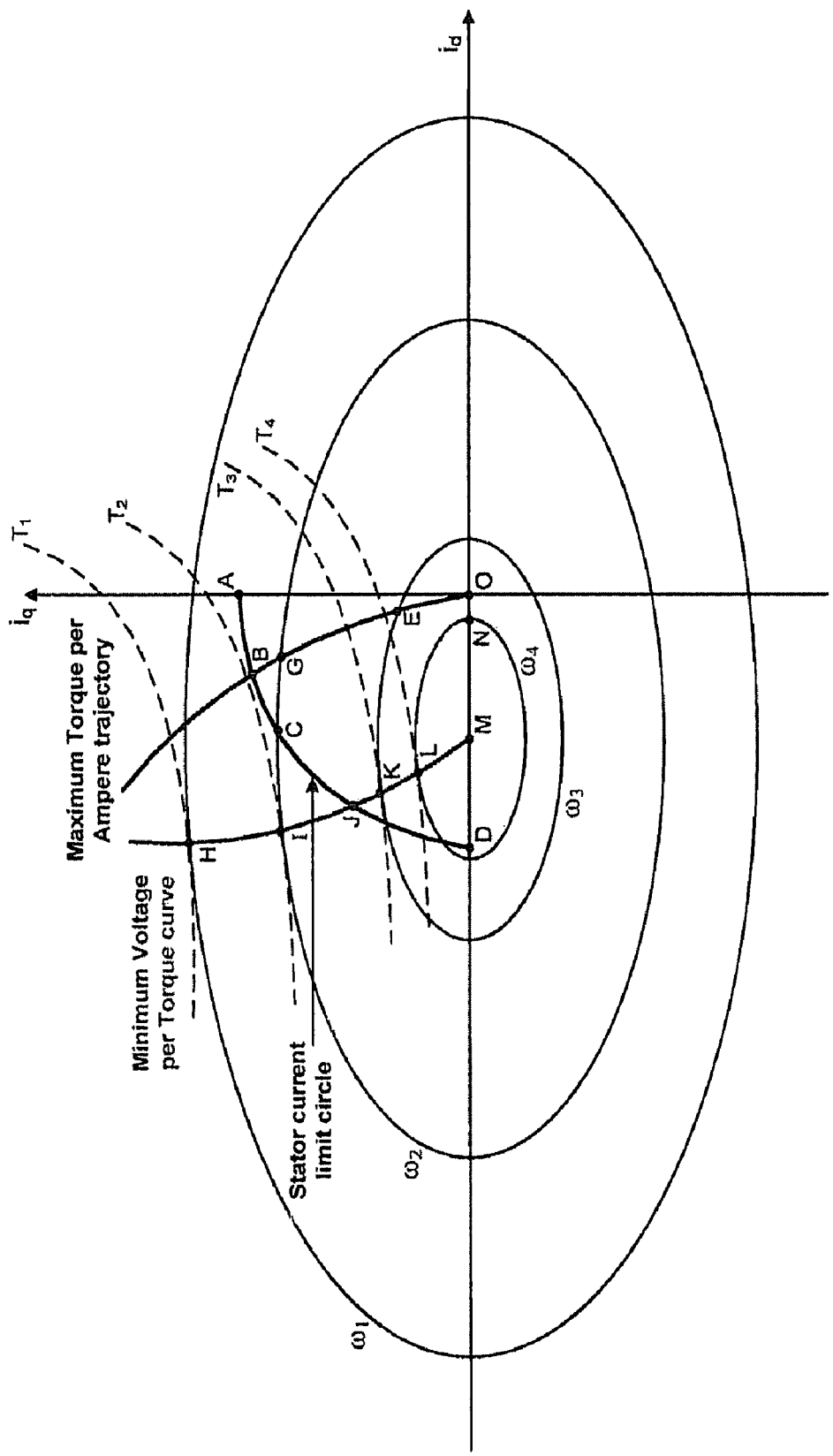
FIG. 3B illustrates a plurality of voltage limit ellipses and a plurality of curves in a d-q plane according to an embodiment of the present invention.

FIGS. 3A and 3B provide a graphical explanation of the voltage limit ellipses for a plurality of speeds (including the critical speed and base speed) and the MTPA trajectory for the base speed.

FIG. 3A includes a plurality of curves and a plurality of voltage limit ellipses in a d-q plane according to an embodiment of the present invention. The plurality of curves includes the MTPA trajectory (OB), the minimum voltage per torque (MVPT) trajectory (MJ), and stator current limit (SCL) trajectory (ABJD). The plurality of voltage limit ellipses includes the base speed ($\omega_b$), the transition speed ($\omega_{transition}$), and the critical speed ($\omega_{critical}$).

The MVPT trajectory determines the peak output torque at each speed from a voltage limitation standpoint. The SCL trajectory determines the peak allowable current running through the stator windings of the IPM machine. Point B is the intersection point of the MTPA trajectory and the SCL trajectory, and point J is the intersection point of the SCL trajectory and the MVPT trajectory.

The base speed ($\omega_b$) is defined as when the voltage limit ellipse crossed point B. When the voltage limit ellipse crosses point J, the corresponding speed is defined as the transition speed, $\omega_{transition}$. Finally, when the voltage limit ellipse crosses point O, the corresponding motor speed is defined as the critical speed, $\omega_{critical}$.

The IPM machine is operating along the MTPA trajectory without voltage constraint or along the voltage limit ellipse when flux weakening is required.

FIG. 3B illustrates a plurality of voltage limit ellipses and a plurality of curves in a d-q plane according to an embodiment of the present invention. The plurality of curves includes the same trajectories as described above with reference to FIG. 3A. The plurality of voltage limit ellipses corresponds to first, second, third and fourth operating speeds, which are included into four main operation regions, respectively, as further described below.

First, when an operating speed is less than the base speed (e.g., $\omega < \omega_{base}$, such as $\omega_1$), the IPM machine is operating along the MTPA trajectory (OEGB) without a limit on voltage limitation. This case belongs to non flux weakening region. As explained with reference to FIG. 1, if the operating speed is the base speed or below the base speed, the operating trajectory is determined based on the MTPA. In this case, the operating trajectory is OEGB.

Second, when the operating speed of the IPM machine is greater than the base speed and less than the transition speed (e.g., $\omega_{base} < \omega_{transition}$, such as $\omega_2$), the IPM machine is operating along the MTPA trajectory until reaching the voltage limit boundary point G. After that, the IPM machine switches to the voltage limit ellipse trajectory until reaching the SCL boundary point C. The operating trajectory at speed $\omega_2$ is the curve OEGC and the output torque is monotonically increasing along this operating curve. The peak torque at this speed is determined by the stator current limit boundary. The case belongs to partial flux weakening region. As explained with reference to FIG. 1, when the operating speed is greater than the base speed and less than the critical speed, the operating trajectory may be based on a comparison of the voltage limit ellipse and the MTPA trajectory. These features are further explained with reference to FIG. 5. However, depending on the current limit value and the machine design parameters, the transition speed may or may not exist. For example, if the current limit value is relatively substantially large, then the transition speed in FIG. 3B may not have to be considered. In this case, the peak torque above the base speed is always limited by the MVPT curve, not the stator current limit curve.

Third, when the operating speed of the IPM machine is greater than the transition speed and less than the critical speed such as $\omega_3$), the IPM machine is operating (e.g., $\omega_{transition} < \omega < \omega_{critical}$, such as $\omega_3$), the IPM machine is operating along the MTPA trajectory until reaching the voltage limit boundary point E. After that, the IPM machine is further operating along the voltage limit ellipse until reaching the MVPT boundary point K. The operating trajectory at speed $\omega_3$ is the curve OEK, and output torque is monotonically increasing along this operating curve. The peak torque at this speed is determined by MVPT boundary. This case also belongs to partial flux weakening region. As explained with reference to FIG. 1, when the operating speed is greater than the base speed and less than the critical speed, the operating trajectory may be based on a comparison of the voltage limit ellipse and the trajectory. These features are further explained with reference to FIG. 5.

Fourth, when the operating speed of the IPM machine is greater than the critical speed (e.g., $\omega > \omega_{critical}$, such as $\omega_4$), the IPM machine is always operating along the voltage limit ellipse until reaching the MVPT boundary point L. The operating trajectory at speed $\omega_4$ is the curve NL and output torque is monotonically increasing along this operating curve. This case belongs to full flux weakening region. As explained with reference to FIG. 1, if the operating speed is above the critical speed, the operating trajectory is determined based only on the voltage limit ellipse with monotonically increasing torque.

Figure 4:
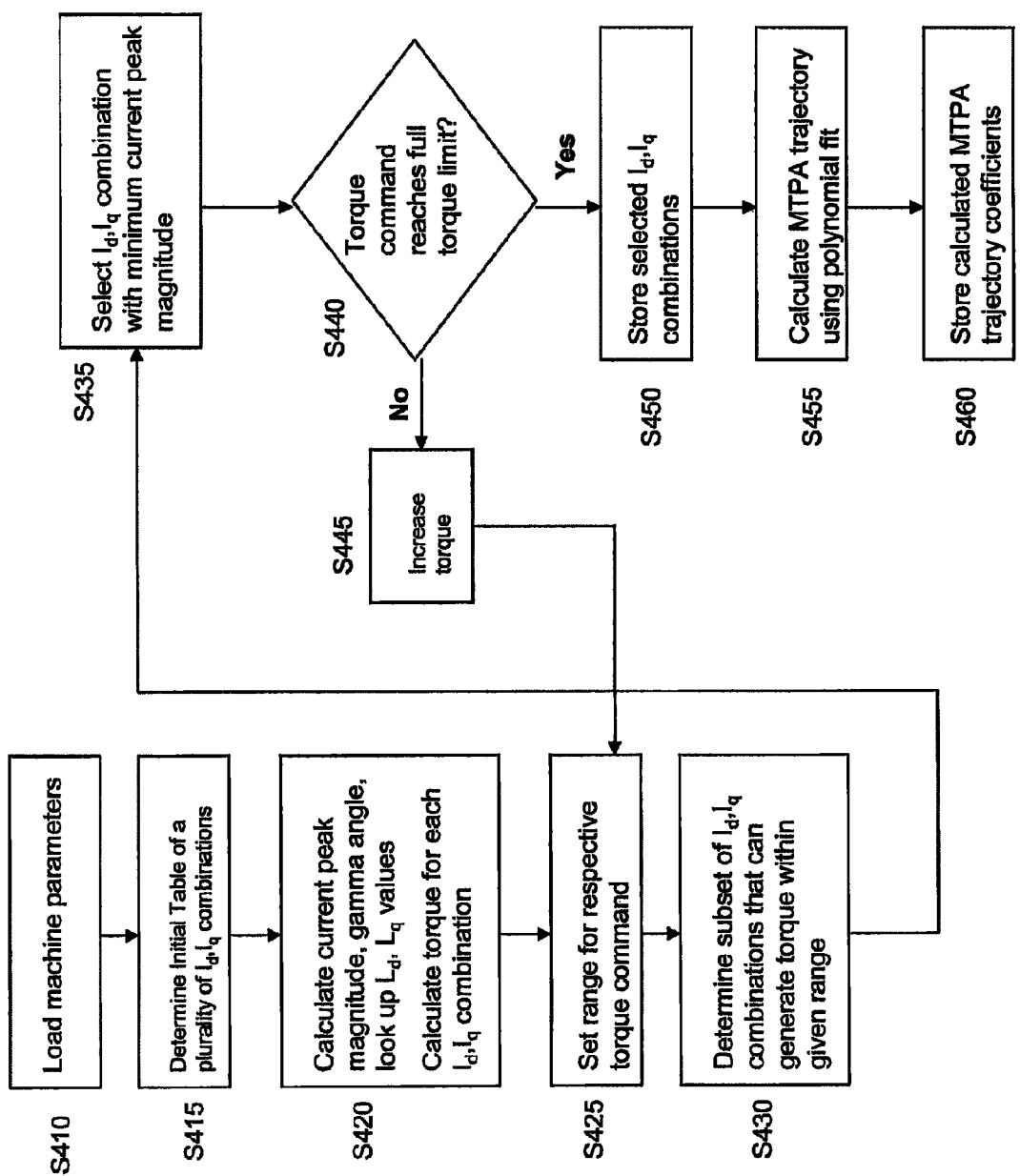
FIG. 4 illustrates a method for calculating the MTPA trajectory for the first threshold speed or a speed below the first threshold speed according to an embodiment of the present invention.
Figure 5:
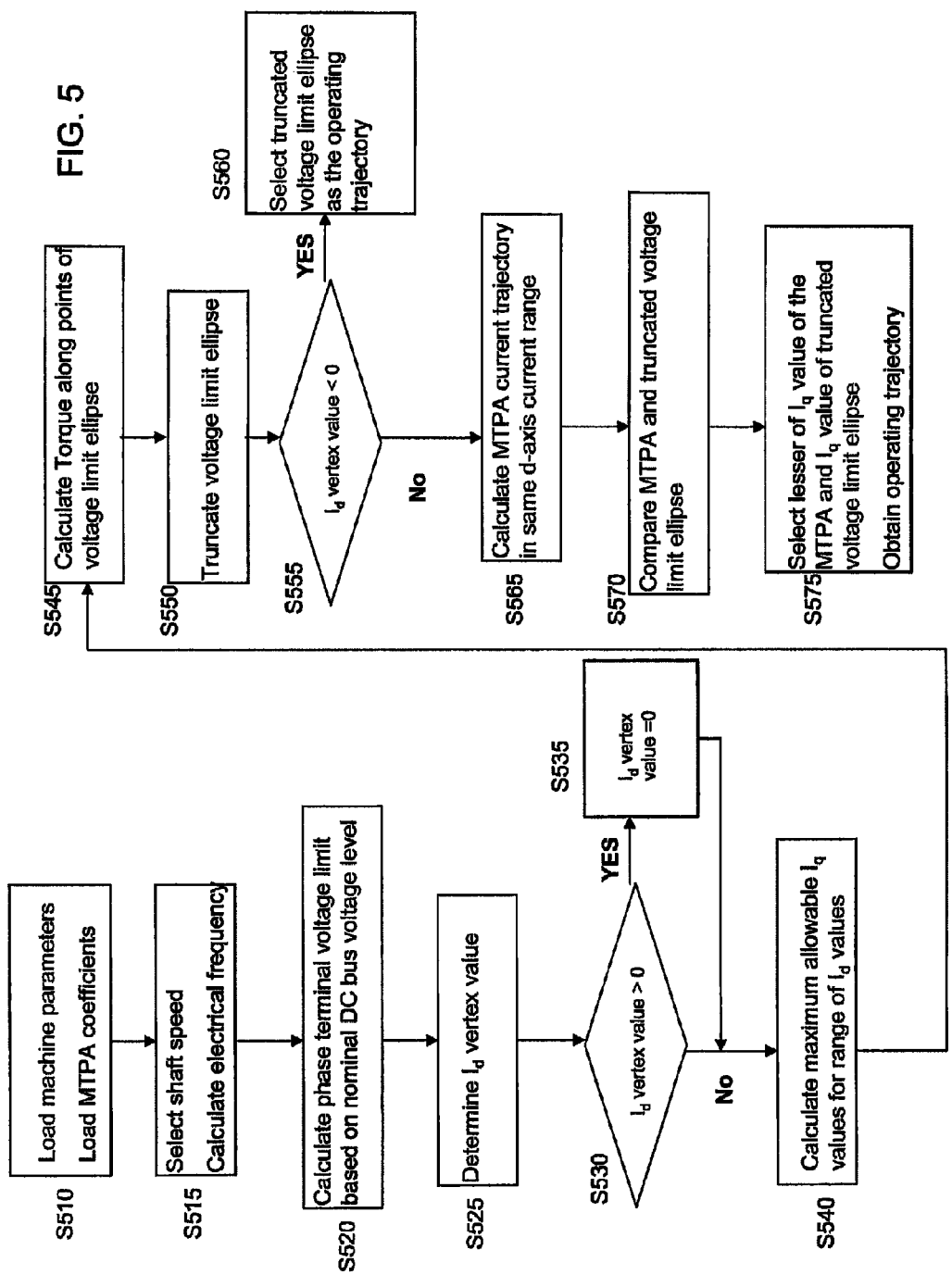
FIG. 5 illustrates a method for generating the $I_d,I_q$ map using the voltage limit ellipse or a combination of the MTPA trajectory and the voltage limit ellipse for operating speeds above the first threshold speed according to an embodiment of the present invention.
Figure 6:
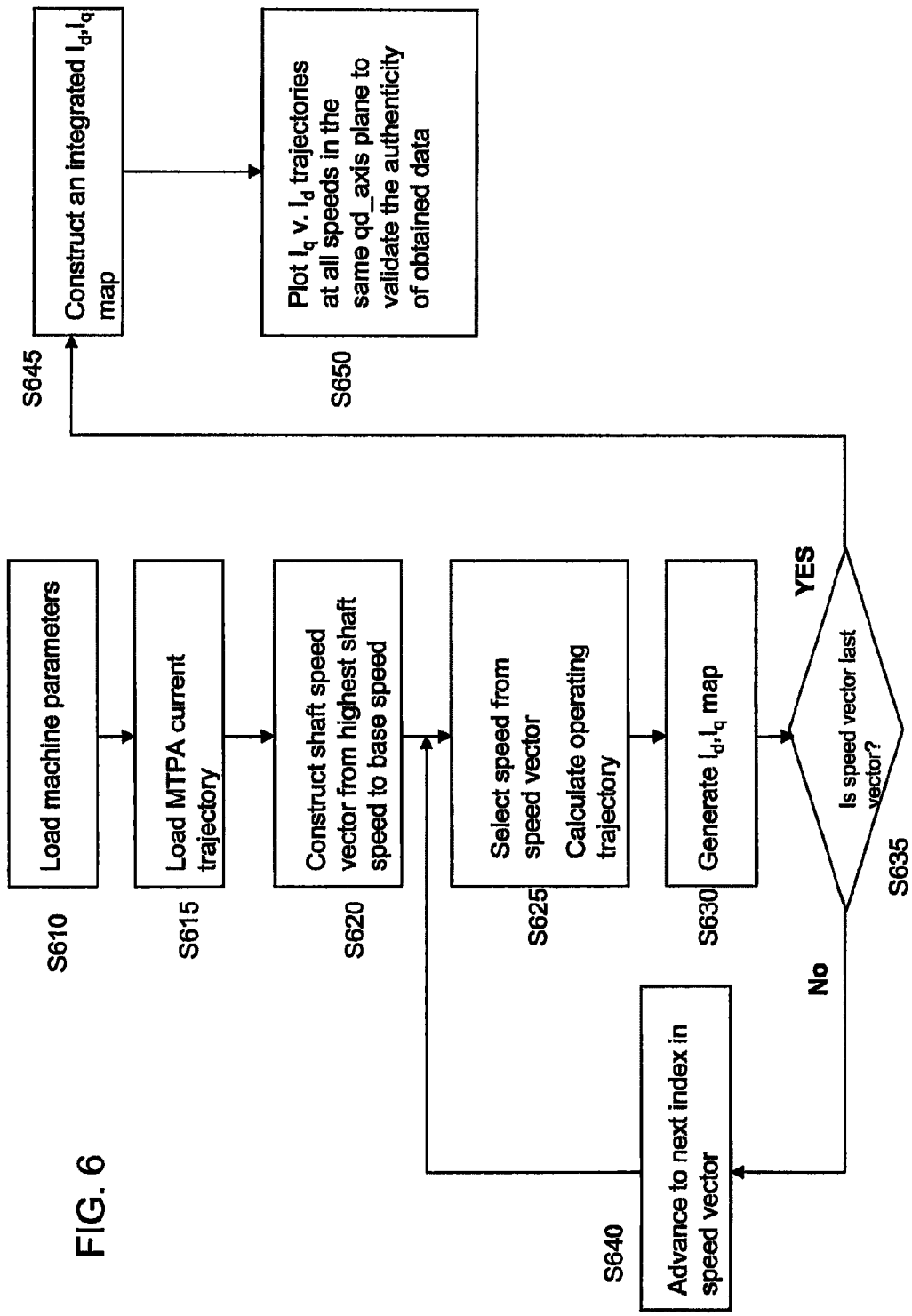
FIG. 6 illustrates a method for calculating operating trajectories for a plurality of speeds and generating a plurality of integrated $I_d,I_q$ maps based on the operating trajectories according to an embodiment of the present invention.

FIGS. 4-6 illustrate methods for determining the operating trajectories and generating operating points for a plurality speeds that may fall within anyone of the above identified regions according to embodiments of the present invention.

FIG. 4 illustrates a method for calculating the MTPA trajectory for the first threshold speed or a speed below the first threshold speed according to an embodiment of the present invention (e.g., step S120 in FIG. 1).

In step 410, the processor 205 loads the IPM machine parameters including the inductance look-up table, the back-emf constant, and/or the current limit, for example. The processor 205 may be configured to load other IPM machine parameters that are well known to one of ordinary skill in the art.

In step 415, the processor 205 determines an initial table. The initial table includes $I_d, I_q$ combinations having values covering all possible values for a preset current limit. For example, when the preset current limit is 500 A, there are 501×501 combinations of ($I_d$, $I_q$). Therefore, the initial table includes each of the possible combination such as (0 A, 1 A; 0 A, 2 A; . . . 500 A, 500 A).

In step S420, the processor 205 calculates the current peak magnitude ($I_s$), the current control angle (γ), the $L_d$ and $L_q$ values for each $I_d,I_q$ combination of the initial table. For example, processor 205 calculates the current peak magnitude ($I_s$) and the current control angle (γ) for each $I_d,I_q$ combination based on Eq. 1 and Eq. 2. Then, the processor 205 obtains the $L_d$ and $L_q$ values for each $I_d,I_q$ combination using the inductance lookup table and the calculated current peak magnitude and the current control angle. For example, using the calculated current peak magnitude ($I_s$) and the current control angle (γ) as inputs, the processor 205 looks up the corresponding $L_d$ and $L_q$ values in the inductance lookup table. Also, in step S420, the processor calculates torque for each $I_d,I_q$ combination of the initial table based on the following equation, for example.

$$\text{Torque} = 1.5 \cdot p(\lambda_f + (L_d - L_q) \cdot I_d) \cdot I_q \qquad \text{Eq. (4)}$$

The parameter p is the number of pole pairs, $\lambda_f$ is the backemf constant, the parameters $L_d$ and $L_q$ are the inductance values obtained from the inductance lookup table, and the parameters $I_d$ and $I_q$ are obtained from the initial table.

In step S425, the processor 205 sets a range for a respective torque command. For instance, for a specific torque command, e.g. 100 Nm, the processor sets a torque range, e.g., 99.5 Nm to 100.5 Nm. As further explained below, the processor 205 will repeat this step in order to obtain an optimal operating point for each torque command among a plurality of torque commands.

In step S430, the processor 205 determines a subset of $I_d,I_q$ combinations from the initial table for a torque command that can generate torque within the set range, and not exceed the current limit. For example, using the results of step S420, the processor 205 searches for all $I_d,I_q$ combinations which can generate torque within the torque range. The calculated torque for each of the $I_d,I_q$ combinations in the determined subset falls within the set torque range encompassing the respective torque command.

In step S435, using the results from step S430, the processor 205 selects the $I_d,I_q$ combination with the minimum current peak magnitude ($I_s$). The selected $I_d,I_q$ combination may represent the operating point with the minimum copper loss among this subset. As such, the selected $I_d,I_q$ combination may be the optimal operating point for the respective torque command level.

In step S440, the processor 205 determines whether the torque command is the last torque command within the plurality of torque comments, which represents the full torque range. If the processor 205 determines that the torque command is not the last torque command (NO), the process returns to step S425. In other words, steps S425, S430 and S435 are repeated for the full range of torque commands, e.g. 5 Nm, 10 Nm, 15 Nm . . . , until maximum output torque is assigned an optimal operating point.

In step S450, the processor 205 stores the selected $I_d,I_q$ combinations corresponding to the plurality of torque commands in the at least one memory 210.

In step S455, the processor 205 calculates the MTPA trajectory, which include the selected $I_d,I_q$ combinations, using a polynomial curve fitting operation. The polynomial cure fitting operation may be any type of operation that generates a curve based on a number of points. Referring back to FIG. 3B, the MTPA trajectory may be the OEGB curve.

In step S460, the processor 205 stores the calculated MTPA trajectory coefficients in the at least one memory 210.

For speeds at the first threshold speed or below the first threshold speed, the processor 205 determines the calculated MPTA trajectory as the operating trajectory for that speed. Based on the operating trajectory that includes the selected $I_d,I_q$ combinations, the processor 205 generates the $I_d,I_q$ map for the first threshold speed or below the first threshold speed that maps the selected $I_d,I_q$ combination to each torque command of the plurality of torque commands. For example, the $I_d,I_q$ map includes the selected $I_d,I_q$ combination corresponding to each torque percentage (e.g., 5%, 10%, etc.) for the full torque operating range.

FIG. 5 illustrates a method for generating the $I_d,I_q$ map using the voltage limit ellipse or a combination of the MTPA trajectory and the voltage limit ellipse for operating speeds above the first threshold speed according to an embodiment of the present invention. FIG. 5 illustrates a method for generating the $I_d,I_g$ map for one operating speed. However, FIG. 6 further expands on the method of FIG. 5 by extending the operation of FIG. 5 for a plurality of speeds.

In S510, the processor 205 loads the machine parameters and the MTPA coefficients that were determined in FIG. 4 from the at least one memory 210.

In S515, the processor 205 selects one speed among a plurality of speeds ranging from above the first threshold speed to the highest speed of the IPM machine. The processor 205 calculates the corresponding electrical frequency based on the following equation.

$$\omega_{electrical} = n/60 \cdot p \cdot 2 \cdot (pi) \qquad \text{Eq. (5)}$$

The parameters n is the speed of the rotor in rpm, and p is the number of pole pairs.

In step S520, the processor 205 calculates the phase terminal voltage limit based on the DC bus voltage level based on the following equation.

$$V_{limit} = \frac{V_{dc}}{\sqrt{3}} \cdot \eta \qquad \text{Eq. (6)}$$

$V_{limit}$ it is the phase terminal voltage limit, $V_{dc}$ is the DC bus voltage, and the parameter η is a coefficient to account for operating conditions. For example, the coefficient η may be a percentage such as 92%. The value of the coefficient η may be any percentage indicating a range or voltage margin. For example, the coefficient η may be any value between 90% and 95%. In one particular embodiment, the coefficient n may be 92% in order make 8% room for a voltage margin such that a range of events may be taken into consideration such as magnet strength variation due to ambient temperature, fast torque command dynamics request additional voltage during transient, and/or imperfect DC bus voltage measurements, for example.

In S525, the processor 205 determines an $I_d$ vertex value for the voltage limit ellipse right vertex for the selected operating speed. For example, the right vertex point can be initialized as (0,0). Next, the terminal voltage for the initialized points are calculated based on the following equations.

$$v_d = r_s i_d - \omega_e L_q i_q \qquad \text{Eq. (7)}$$

$$v_q = r_s i_q + \omega_e L_d i_d + \omega_e \lambda_f \qquad \text{Eq. (8)}$$

$$v_{term} = \sqrt{v_d^2 + v_q^2} \qquad \text{Eq. (9)}$$

The parameter $v_d$ is the d-axis voltage, $v_q$ is the q-axis voltage, $r_s$ is the stator resistance, $i_d$ is the d-axis current, $i_q$ is the q-axis current, $L_d$ is the d-axis inductance, $L_q$ is the q-axis inductance, $\omega_e$ is the electrical frequency of the IPM and $\lambda_f$ is the strength of the permanent magnet on the rotor of the IPM. $L_d$ and $L_q$ are obtained from the lookup table.

If the resulting terminal voltage $V_{term}$, from Eqs. (7)-(9), is lower than the phase terminal voltage limit $V_{limit}$ from Eq. (6), the $I_d$ vertex value is larger than zero. Otherwise, while keeping $I_q=0$, the processor 205 gradually increases the $I_d$ value magnitude along the negative d-axis (e.g., from 0 to −1, −2, etc.) until the resulting terminal voltage $V_{term}$ is equal or approximately equal to the phase terminal voltage limit $V_{limit}$. Then, the processor 205 sets the closest integer value to achieve this condition as $I_d$ vertex value which is a negative number.

In S525, the processor 205 determines whether the determined $I_d$ vertex value is greater than zero. If the processor 205 determines that the determined $I_d$ vertex value is greater than zero (YES), the processor 205 forces the $I_d$ vertex value to zero, and the process proceeds to step S540. If the processor 205 determines that the determined $I_d$ vertex value is less than or equal to zero (NO), the process uses the determined $I_d$ vertex value in step S540.

In S540, the processor 205 calculates the maximum allowable $I_q$ values corresponding to a range of $I_d$ values, where the range of $I_d$ values is from the determined $I_d$ vertex value to a preset minimum $I_d$ limit. The preset minimum $I_d$ limit should be selected such that the generated maximum torque at that $I_d$ limit will equal or exceed the specified peak toque at the selected speed. For example, if $I_d$ is −50 A, then the $I_q$ value is increased from 0 to 1, and the processor evaluates at least two conditions: (1) whether the corresponding terminal voltage $V_{term}$ is below the phase terminal voltage limit $V_{limit}$ and (2) whether the peak current magnitude is below the current limit. If the result is yes for both conditions, the processor 205 increases the $I_q$ magnitude (e.g. to 2, 3, 4, etc.) until the result from at least one of the above conditions is no. As a result, the processor 205 calculates the maximum allowable $I_q$ value for every $I_d$ value in the range. It is noted that the above procedure applies to the following two cases, as explained above with $\omega_{base} < \omega < \omega_{transition}$ and $\omega_{transition} < \omega_{critical}$, as explained above with reference to FIG. 3(b).

In step S545, the processor 205 calculates torque at different points of the voltage limit ellipse. As explained above, in the set $I_d$ range, the processor 205 calculates the maximum possible $I_q$ value for each corresponding $I_d$ value. Then, for every ($I_d$, $I_q$) combination, the processor 205 obtains the corresponding current peak magnitude $I_s$, the current control angle, the inductance values $L_d, L_q$, and then calculates the torque at each found point along the voltage limit ellipse based on Eqs. (1)-(4).

In step S550, the processor 205 truncates the calculated voltage limit ellipse by finding the monotonically increasing torque of the voltage limit ellipse, and subsequently discarding the monotonically decreasing torque. For example, because the torque value at every point along the voltage limit ellipse is known from step S545, the processor 205 truncates the voltage limit ellipse when the calculated torque stops increasing.

In step S555, the processor 205 determines whether the $I_d$ vertex value is less than zero. If the processor 205 determines that the $I_d$ vertex value is less than zero (YES), this indicates that the selected speed is equal to or higher than the second threshold speed (e.g., the critical speed). As such, in step S560, the processor 205 selects the truncated voltage limit ellipse as the operating trajectory, and generates the $I_d, I_q$ map based on the truncated voltage limit ellipse. If the processor 205 determines that the $I_d$ vertex value is equal to or greater than zero (NO), this indicates that the selected speed is lower than the second threshold speed (e.g., critical speed) and higher than the first threshold speed (e.g., base speed). As such, the processor 205 determines the operating trajectory based on a comparison of the MTPA trajectory and the calculated truncated voltage limit ellipse, as further explained below.

In step S565, the processor 205 calculates the MTPA trajectory from FIG. 4 in the same d-axis current range. Next, in step S570, the processor 205 compares the calculated MTPA trajectory with the calculated truncated voltage limit ellipse. In step S575, the processor 205 selects the lesser of the $I_q$ value of the calculated MTPA trajectory and the $I_q$ value of the calculated truncated voltage limit ellipse for each $I_d$ value. As such, the operating trajectory for the selected speed includes the selected $I_q$ values.

FIG. 6 illustrates a method for calculating operating trajectories for a plurality of speeds and generating a plurality of integrated $I_d, I_q$ maps based on the operating trajectories according to an embodiment of the present invention.

In step 610, the processor 210 loads the machine parameters from the at least one memory 210. In step 615, the processor 210 loads the MTPA trajectory for the first threshold speed that was calculated in FIG. 4. In step 620, the processor 205 constructs a speed vector from the highest speed vector to the first threshold speed. In step 625, the processor 205 selects one of the speed vectors and calculates the operating trajectory for that speed using the method described in FIG. 5. In step S630, the processor generates an $I_d, I_q$ map based on the calculated operating trajectory.

In step S635, the processor 205 determines whether the selected speed vector is the last vector. If the processor 205 determines that the selected speed vector is not the last vector (NO), the processor returns to step S625. As such, the processor 205 repeats steps S625 and S630 for each speed of the plurality of speeds in the vector. As a result, the processor 205 generates a plurality of $I_d, I_q$ maps for the plurality of speeds. If the processor 205 determines that the selected speed vector is the last vector (YES), the process continues to step 645 to construct an integrated $I_d, I_q$ map at all evaluated speeds in the speed vector.

Optionally, in step 650, the processor 205 may plot $I_q$ versus $I_d$ trajectories at all speeds in the same d-q plane to validate the authenticity of the obtained data.

Next, an application of the characterization and in particular, the initial lookup table generated according to the above described procedures will be described with respect to FIG. 7 below.

Figure 7:
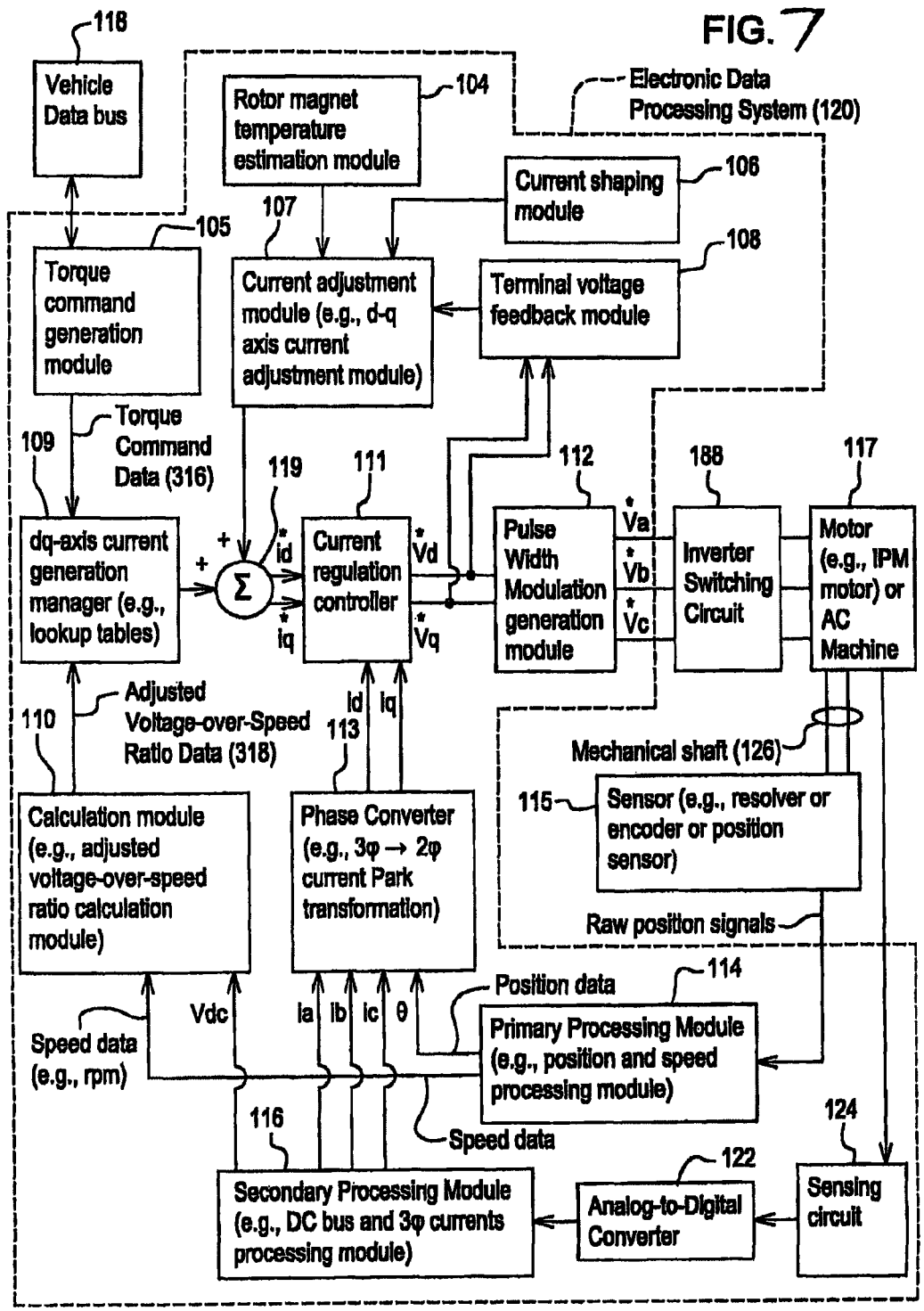
FIG. 7 is a block diagram of one embodiment of a system for controlling an electrical IPM machine.

In accordance with one embodiment, FIG. 7 discloses a system for controlling a IPM machine 117 (e.g., an interior permanent magnet (IPM) IPM machine) or another alternating current machine. In one embodiment, the system, aside from the IPM machine 117, may be referred to as an inverter or a IPM machine controller.

The system comprises electronic modules, software modules, or both. In one embodiment, the IPM machine controller comprises an electronic data processing system 120 to support storing, processing or execution of software instructions of one or more software modules. The electronic data processing system 120 is indicated by the dashed lines in FIG. 7 and is shown in greater detail in FIG. 8.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the IPM machine 117. In turn, the inverter circuit 188 is coupled to the IPM machine 117. The IPM machine 117 is associated with a sensor 115 (e.g., a position sensor, a resolver or encoder position sensor) that is associated with the IPM machine shaft 126 or the rotor. The sensor 115 and the IPM machine 117 are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the IPM machine 117.

In one embodiment, the torque command generation module 105 is coupled to a d-q axis current generation manager 109 (e.g., d-q axis current generation look-up tables) along with an adjusted voltage over speed ratio from the calculation module 110. The d-q axis current generation manager 109 may store any one of the above described lookup tables. The output of the d-q axis current generation manager 109 and the output of a current adjustment module 107 (e.g., d-q axis current adjustment module 107) are fed to a summer 119. In turn, one or more outputs (e.g., direct axis current data ($i_d^*$) and quadrature axis current data ($i_q^*$)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d^*$ and $i_q^*$) and actual d-q axis currents (e.g., $i_d$ and $i_q$) and outputs corresponding d-q axis voltage commands (e.g., $v_d^*$ and $v_q^*$ commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the IPM machine 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the IPM machine 117. The PWM generation module 112 provides inputs to a driver stage within the inverter circuit 188. An output stage of the inverter circuit 188 provides a pulse-width modulated voltage waveform or other voltage signal for control of the IPM machine. In one embodiment, the inverter 188 is powered by a direct current (DC) voltage bus.

The IPM machine 117 is associated with a sensor 115 (e.g., a resolver, encoder, speed sensor, or another position sensor or speed sensors) that estimates at least one of an angular position of the IPM machine shaft 126, a speed or velocity of the IPM machine shaft 126, and a direction of rotation of the IPM machine shaft 126. The sensor 115 may be mounted on or integral with the IPM machine shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the IPM machine shaft 126 or rotor.

A first output (e.g., position data and speed data for the IPM machine 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the IPM machine 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the IPM machine 117 for measuring three phase currents (e.g., current applied to the windings of the IPM machine 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., IPM machine shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), IPM machine load conditions, respective IPM machine torque and corresponding operational speed, and vehicle electrical loads (e.g., electrically driven air-conditioning compressor). The calculation module 110 is connected as an inter between the secondary processing module 116 and the dq-axis current generation manager 109. The output of the calculation module 110 can adjust or impact current commands generated by the d-q axis current generation manager 109 to compensate for flu or variation in direct current bus voltage, among other things. The structure and operation of the calculation module 110 is described in detail in U.S. application Ser. No. Unknown, entitled " ", filed Feb. 28, 2011 by the inventor of the subject application; the entire contents of which are hereby incorporated by reference.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor peg magnet or magnets. In one embodiment, the rotor magnet temperature estimation module 104 may estimate the temperature of the rotor magnets from, one or more sensors located on the stator, in thermal communication with the stator, or secured to the housing of the IPM machine 117.

In another embodiment, the rotor magnet temperature estimation module 104 may be replaced with a temperature detector (e.g., a thermistor and wireless transmitter like infrared thermal sensor) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected IPM machine shaft 126 speed data. For example, the d-q axis current generation manager 109 selects or determines the direct axis current command, the quadrature axis current command by accessing control lookup tables such as the above-described lookup tables. The sensor 115 on the IPM machine 117 facilitates provision of the detected speed data for the IPM machine shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104, the current shaping module 106, and terminal voltage feedback module 108.

The current shaping module 106 may determine a correction or preliminary adjustment of the quadrature axis (q-axis) current command and the direct axis (d-axis) current command based on one or more of the following factors: torque load on the IPM machine 117 and speed of the IPM machine 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

In one embodiment, the IPM machine 117 may comprise an interior permanent magnet (IPM) machine or a synchronous IPM machine (IPMSM). An IPMSM has many favorable advantages compared with conventional induction machines or surface mounted PM machines (SMPM) such as high efficiency, high power density, wide constant power operating region, maintenance free, for instance.

The sensor 115 (e.g., shaft or rotor speed detector) may comprise one or more of the following: a direct current IPM machine, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the IPM machine shaft 126. In another configuration, the sensor 115 comprises a speed sensor, or the combination of a speed sensor and an integrator to determine the position of the IPM machine shaft.

In yet another configuration, the sensor 115 comprises an auxiliary, compact direct current generator that is coupled mechanically to the IPM machine shaft 126 of the IPM machine 117 to determine speed of the IPM machine shaft 126, where the direct current generator produces an output voltage proportional to the rotational speed of the IPM machine shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the IPM machine shaft 126. In an additional configuration, the sensor 115 comprises a resolver with a first winding and a second winding, where the first winding is fed with an alternating current, where the voltage induced in the second winding varies with the frequency of rotation of the rotor.

Figure 8:
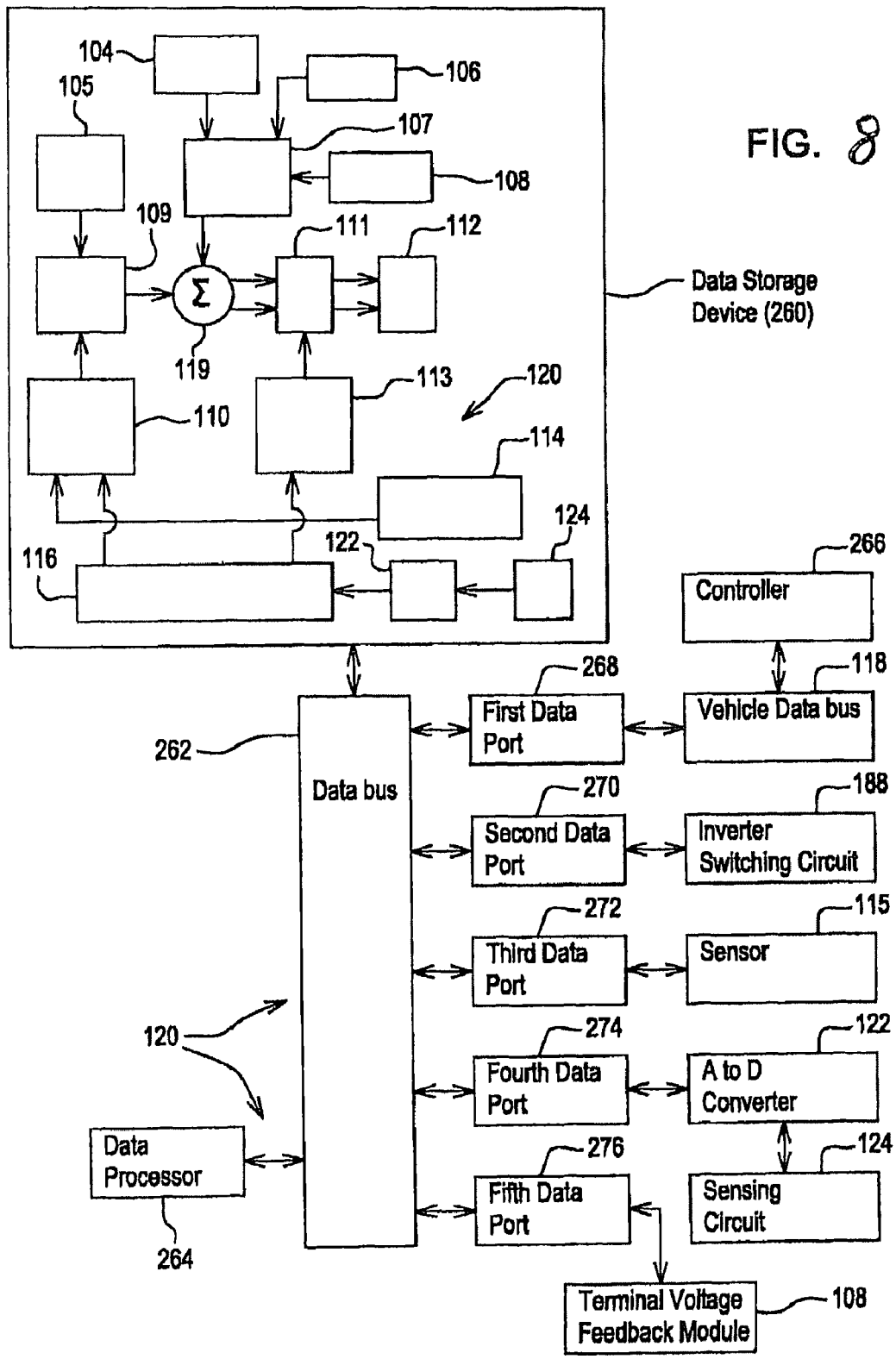
FIG. 8 is a block diagram of an electronic data processing system consistent with FIG. 7.

In FIG. 8, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 8, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 8, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

The invention being thus described, it will be obvious that the same may be varied in many ways. Such variations are not to be regarded as a departure from the invention, and all such modifications are intended to be included within the scope of the invention.

What is claimed:

1. A method for generating initial operating points for controlling an interior peg magnet (IPM) machine, the method comprising:
    loading an inductance lookup table, the inductance lookup table including sets of a direct axis inductance ($L_d$) value and a quadrature axis inductance ($L_q$) value, each set corresponding to a current peak magnitude and a current control angle, the current control angle indicating amounts of the current peak magnitude appearing as direct axis current ($I_d$) and quadrature axis current ($I_q$);
    first calculating a maximum torque per Ampere (MTPA) trajectory for a first threshold speed based on machine parameters of the IPM machine, the machine parameters including the inductance lookup table;
    second calculating a truncated voltage limit ellipse with monotonically increasing torque for a first speed based on the machine parameters, if the first speed is higher than the first threshold speed;
    determining an operating trajectory at the first speed based on at least one of the calculated MTPA trajectory and the calculated truncated voltage limit ellipse; and
    generating an $I_d,I_q$ map that maps an $I_d$ value and an $I_q$ value to each torque command of a plurality of torque commands for the first speed based on the determined operating trajectory.

2. The method of claim 1, wherein the first threshold speed is a base speed, the base speed being a maximum shaft speed at which maximum constant output torque of the IPM machine is achieved.

3. The method of claim 1, wherein the determining step includes:
    if the first speed is lower than a second threshold speed and higher than the first threshold speed, the determining step determines the operating trajectory based on a comparison of the calculated MTPA trajectory and the calculated truncated voltage limit ellipse;
    if the first speed is the second threshold speed or higher than the second threshold speed, the determining step determines the operating trajectory based on the calculated truncated voltage limit ellipse with monotonically increasing torque only; and
    if the first speed is the first threshold speed or lower than the first threshold speed, the determining step determines the operating trajectory based on the calculated MTPA trajectory.

4. The method of claim 3, wherein the second threshold speed is a critical speed, the critical speed being a speed at which uncontrolled generation (UCG) voltage from a back-electromotive force (backemf) of the IPM machine is equal to a direct current (DC) bus voltage.

5. The method of claim 3, wherein if the first speed is lower than the second threshold speed and higher than the first threshold speed, the determining step includes:
    selecting lesser of an $I_q$ value of the calculated MTPA trajectory and an $I_q$ value of the calculated truncated voltage limit ellipse for each $I_d$ value, wherein the operating trajectory includes the selected $I_q$ values.

6. The method of claim 1, wherein the first calculating step includes:
    determining an initial table, the initial table including $I_d,I_q$ combinations having values covering all possible values for a preset current limit;
    calculating the current peak magnitude, the current control angle, and the $L_d$ and $L_q$ values for each $I_d,I_q$ combination of the initial table;
    calculating torque for each $I_d,I_q$ combination of the initial table based on the machine parameters;
    setting a torque range for each of the plurality of torque commands;
    determining a subset of $I_d,I_q$ combinations for each torque command based on the calculated torque and the set torque range;
    selecting an $I_d,I_q$ combination from each subset that has a calculated current peak magnitude less than other $I_d,I_q$ combinations of the subset; and
    calculating the MTPA trajectory based on the selected sets of $I_d,I_q$ combinations.

7. The method of claim 6, wherein the calculated torque for each of the $I_d,I_q$ combinations in the determined subset falls within the set torque range encompassing a respective torque command.

8. The method of claim 1, wherein the second calculating step includes:
    determining an $I_d$ vertex value for the voltage limit ellipse right vertex at a set shaft speed based on the machine parameters;
    calculating maximum allowable $I_q$ values corresponding to a range of $I_d$ values, the range of $I_d$ values being from the determined $I_d$ vertex value to a preset minimum $I_d$ limit; and
    calculating the voltage limit ellipse for the first speed based on the calculated maximum allowable $I_q$ values.

9. The method of claim 8, wherein the $I_d$ vertex value is forced to zero if the determined $I_d$ vertex value is greater than zero.

10. The method of claim 8, wherein the second calculating step further includes:
    calculating torque along points of the calculated voltage limit ellipse at the first speed; and
    truncating the calculated voltage limit ellipse by disregarding monotonically decreasing torque.

11. The method of claim 1, further comprising:
    obtaining the $L_d$ values and the $L_q$ values using finite element analysis based simulation; and
    generating the inductance look-up table based on the obtained inductance parameters.

12. The method of claim 1, further comprising:
    generating a different $I_d,I_q$ map for a plurality of speeds by repeating the second calculating step, the determining step, and the generating step for each speed; and
    constructing an integrated $I_d,I_q$ map based on the plurality of $I_d,I_q$ maps.

13. The IPM machine including a machine controller having the $I_d,I_q$ map generated in claim 1.

14. A method for generating initial operating points for controlling an interior permanent magnet (IPM) machine, the method comprising:
    first calculating a maximum torque per Ampere (MTPA) trajectory for a first threshold speed based on machine parameters of the IPM machine;

second calculating a truncated voltage limit ellipse with monotonically increasing torque for a first speed based on the machine parameters, if the first speed is higher than the first threshold speed;

determining an operating trajectory at the first speed based on at least one of the calculated MTPA trajectory and the calculated truncated voltage limit ellipse, the determining step including, determining the operating trajectory based on a comparison of the calculated MTPA trajectory and the calculated truncated voltage limit ellipse if the first speed is lower than a second threshold speed and higher than the first threshold speed; and generating an $I_d, I_q$ map that maps a direct axis current ($I_d$) value and a quadrature axis current ($I_q$) value to each torque command of a plurality of torque commands for the first speed based on the determined operating trajectory.

15. The method of claim 14, wherein the first threshold speed is a base speed, the base speed being a maximum shaft speed at which maximum constant output torque of the IPM machine is achieved, the second threshold speed is a critical speed, the critical speed being a speed at which uncontrolled generation (UCG) voltage from a back-electromotive force (back-emf) of the IPM machine is equal to a direct current (DC) bus voltage.

16. The method of claim 14, wherein the machine parameters include an inductance lookup table, the inductance lookup table including sets of a direct axis inductance ($L_d$) value and a quadrature axis inductance ($L_q$) value, each set corresponding to a current peak magnitude and a current control angle, the current control angle indicating amounts of the current peak magnitude appearing as $I_d$ and $I_q$.

17. The method of claim 14, wherein the determining step further includes:

if the first speed is the second threshold speed or higher than the second threshold speed, the determining step determines the operating trajectory based on the calculated truncated voltage limit ellipse with monotonically increasing torque only; and if the first speed is the first threshold speed or lower than the first threshold speed, the determining step determines the operating trajectory based on the calculated MTPA trajectory.

18. The method of claim 14, wherein the determining step further includes:

selecting lesser of an $I_q$ value of the calculated MTPA trajectory and an $I_q$ value of the calculated truncated voltage limit ellipse for each $I_d$ value, wherein the operating trajectory includes the selected $I_q$ values.

19. The method of claim 14, wherein the first calculating step includes:

determining an initial table, the initial table including $I_d, I_q$ combinations having values covering all possible values for a preset current limit;

calculating the current peak magnitude, the current control angle, and the $L_d$ and $L_q$ values for each $I_d, I_q$ combination of the initial table;

calculating torque for each $I_d, I_q$ combination of the initial table based on the machine parameters;

setting a torque range for each of the plurality of torque commands;

determining a subset of $I_d, I_q$ combinations for each torque command based on the calculated torque and the set torque range;

selecting an $I_d, I_q$ combination from each subset that has a calculated current peak magnitude less than other $I_d, I_q$ combinations of the subset; and calculating the MTPA trajectory based on the selected sets of $I_d, I_q$ combinations.

20. The method of claim 19, wherein the calculated torque for each of the $I_d, I_q$ combinations in the determined subset falls within the set torque range encompassing a respective torque command.

21. The method of claim 14, wherein the second calculating step includes:

determining an $I_d$ vertex value at the voltage limit ellipse right vertex point at a set shaft speed based on the machine parameters;

calculating maximum allowable $I_q$ values corresponding to a range of $I_d$ values, the range of $I_d$ values being from the determined $I_d$ vertex value to a preset minimum $I_d$ limit; and calculating the voltage limit ellipse for the first speed based on the calculated maximum allowable $I_q$ values.

22. The method of claim 21, wherein the $I_d$ vertex value is forced to zero if the determined $I_d$ vertex value is greater than zero.

23. The method of claim 21, wherein the second calculating step further includes:

calculating torque along points of the calculated voltage limit ellipse at the first speed; and truncating the calculated voltage limit ellipse by disregarding monotonically decreasing torque.

24. The method of claim 14, further comprising:

generating a different $I_d, I_q$ map for a plurality of speeds by repeating the second calculating step, the determining step, and the generating step for each speed; and constructing an integrated $I_d, I_q$ map based on the plurality of $I_d, I_q$ maps.

25. The IPM machine including a machine controller having the $I_d, I_q$ map generated in claim 14.

26. A computer processing unit for generating initial operating points for controlling an interior permanent magnet (IPM) machine, the computer processing unit comprising:

a memory configured to store machine parameters, the machine parameters including an inductance lookup table, the inductance lookup table including sets of a direct axis inductance ($L_d$) value and a quadrature axis inductance ($L_q$) value, each set corresponding to a current peak magnitude and a current control angle, the current control angle indicating amounts of the current peak magnitude appearing as direct axis current ($I_d$) and quadrature axis current ($I_q$); and a processor configured to first calculate a maximum torque per Ampere (MTPA) trajectory for a first threshold speed based on the machine parameters, the processor configured to second calculate a truncated voltage limit ellipse with monotonically increasing torque for a first speed based on the machine parameters, if the first speed is higher than the first threshold speed, the processor configured to determine an operating trajectory at the first speed based on at least one of the calculated MTPA trajectory and the calculated truncated voltage limit ellipse, the processor configured to generate an $I_d, I_q$ map that maps an $I_d$ value and an $I_q$ value to each torque command of a plurality of torque commands for the first speed based on the determined operating trajectory.

27. The computer processing unit of claim 26, wherein the first threshold speed is a base speed, the base speed being a maximum shaft speed at which maximum constant output torque of the IPM machine is achieved.

28. The computer processing unit of claim 26, wherein
if the first speed is lower than a second threshold speed and higher than the first threshold speed, the processor is configured to determine the operating trajectory based on a comparison of the calculated MTPA trajectory and the calculated truncated voltage limit ellipse;
if the first speed is the second threshold speed or higher than the second threshold speed, the processor is configured to determine the operating trajectory based on the calculated truncated voltage limit ellipse with monotonically increasing torque only; and
if the first speed is the first threshold speed or lower than the first threshold speed, the processor is configured to determine the operating trajectory based on the calculated MTPA trajectory.

29. The computer processing unit of claim 28, wherein the second threshold speed is a critical speed, the critical speed being a speed at which uncontrolled generation (UCG) voltage from a back-electromotive force (backemf) of the IPM machine is equal to a direct current (DC) bus voltage.

30. The computer processing unit of claim 28, wherein if the first speed is lower than the second threshold speed and higher than the first threshold speed, the processor is configured to select lesser of an $I_q$ value of the calculated MTPA trajectory and an $I_q$ value of the calculated truncated voltage limit ellipse for each $I_d$ value, wherein the operating trajectory includes the selected $I_q$ values.

31. The computer processing unit of claim 26, wherein
the processor is configured to determine an initial table, the initial table including $I_d,I_q$ combinations having values covering all possible values for a preset current limit;
the processor is configured to calculate the current peak magnitude, the current control angle, and the $L_d$ and $L_q$ values for each $I_d,I_q$ combination of the initial table;
the processor is configured to calculate torque for each $I_d,I_q$ combination of the initial table based on the machine parameters;
the processor is configured to set a torque range for each of the plurality of torque commands;
the processor is configured to determine a subset of $I_d,I_q$ combinations for each torque command based on the calculated torque and the set torque range;
the processor is configured to select an $I_d,I_q$ combination from each subset that has a calculated current peak magnitude less than other $I_d,I_q$ combinations of the subset; and
the processor is configured to calculate the MTPA trajectory based on the selected sets of $I_d,I_q$ combinations.

32. The computer processing unit of claim 31, wherein the calculated torque for each of the $I_d,I_q$ combinations in the determined subset falls within the set torque range encompassing a respective torque command.

33. The computer processing unit of claim 26, wherein
the processor is configured to determine an $I_d$ vertex value for the voltage limit ellipse right vertex at a set shaft speed based on the machine parameters;
the processor is configured to calculate maximum allowable $I_q$ values corresponding to a range of $I_d$ values, the range of $I_d$ values being from the determined $I_d$ vertex value to a preset minimum $I_d$ limit; and
the processor is configured to calculate the voltage limit ellipse for the first speed based on the calculated maximum allowable $I_q$ values.

34. The computer processing unit of claim 33, wherein the $I_d$ vertex value is forced to zero if the determined $I_d$ vertex value is greater than zero.

35. The computer processing unit of claim 33, wherein
the processor is configured to calculate torque along points of the calculated voltage limit ellipse at the first speed;
the processor is configured to truncate the calculated voltage limit ellipse by disregarding monotonically decreasing torque.

36. The computer processing unit of claim 26, wherein
the processor is configured to generate a different $I_d,I_q$ map for a plurality of speeds by repeating the second calculating step, the determining step, and the generating step for each speed; and
the processor is configured to construct an integrated $I_d,I_q$ map based on the plurality of $I_d,I_q$ maps.

* * * * *